United States Patent [19]
Flammer, III

[11] Patent Number: 5,903,566
[45] Date of Patent: May 11, 1999

[54] METHOD FOR DISTRIBUTING PROGRAM CODE TO INTELLIGENT NODES IN A WIRELESS MESH DATA COMMUNICATION NETWORK

[75] Inventor: George H. Flammer, III, Cupertino, Calif.

[73] Assignee: Metricom, Inc., Los Gatos, Calif.

[21] Appl. No.: 08/265,185

[22] Filed: Jun. 24, 1994

[51] Int. Cl.⁶ .................................................. H04J 3/24
[52] U.S. Cl. ............................................................ 370/406
[58] Field of Search .......................... 370/94.1, 60, 94.3, 370/85.1, 85.6, 110.1, 58.2, 58.3, 61, 389, 428, 429, 412, 401, 400, 406, 407, 408, 270, 464, 338, 310; 395/325, 725, 275, 200.01, 200.05, 200.07, 200.08, 843, 600, 800, 200.79, 200.51, 828, 200.5, 500; 348/7–10, 12, 13, 385; 340/825.5, 825.51, 825.03; 371/37.1, 37.4, 37.5; 364/222.81, 222.82; 455/4.1, 5.1, 56; 379/29, 34, 90.01, 102.03

[56] References Cited

U.S. PATENT DOCUMENTS

| | | | |
|---|---|---|---|
| 4,225,884 | 9/1980 | Block et al. | 380/20 |
| 4,644,496 | 2/1987 | Andrews | 395/800 |
| 4,941,089 | 7/1990 | Fischer | 370/94.1 |
| 5,007,052 | 4/1991 | Flammer | 370/85.6 |
| 5,079,767 | 1/1992 | Perlman | 370/94.3 |
| 5,079,768 | 1/1992 | Flammer | 370/94.1 |
| 5,115,433 | 5/1992 | Baran et al. | 370/94.3 |
| 5,319,454 | 6/1994 | Schutte | 348/7 |
| 5,353,283 | 10/1994 | Tsuchiya | 370/94.3 |
| 5,371,532 | 12/1994 | Gelman et al. | 348/7 |
| 5,485,370 | 1/1996 | Moss et al. | 379/93.17 |

*Primary Examiner*—Dang Ton
*Attorney, Agent, or Firm*—Townsend and Townsend and Crew LLP

[57] ABSTRACT

A large data file is distributed to a number of nodes in a data communication network by a process of distributed downloading. Destination nodes are informed of the location in the network of the large data file and are directed to receive the large data file by requesting that blocks of data containing the file be transmitted to them from the designated source node. The destination nodes control the file transfer. The large data file may contain program code for updating network software.

10 Claims, 3 Drawing Sheets

METHOD FOR DISTRIBUTING PROGRAM CODE TO INTELLIGENT NODES IN A WIRELESS MESH DATA COMMUNICATION NETWORK

BACKGROUND OF THE INVENTION

The invention relates generally to the field of data communication between digital devices in a network and more specifically to a method for routing a very large data file to a number of digital devices in a packet communication network.

Packet communication is a form of data communication whereby segments or packets of data are routed with error checking and confirmation of receipt. Packets may be transmitted directly between a source node and a destination node or may be relayed via a number of relay nodes. Several methods of data packet routing are known.

Some methods of packet communication are directory-based routing and non-directory-based routing. According to directory-based routing method, the address in the header of a packet is used as an index to a directory of packet routing lists stored in a source node. The source node must maintain and continuously update a routing list for each node in the network. In non-directory-based routing, the complexities associated with directory-based routing techniques are avoided. There is no need to store connectivity information for each transmitting node in the network, thus reducing the amount of overhead processing that must be done by the network to preserve network connections. However, non-directory-based routing techniques generally do not permit network parameter optimization. A number of patents have issued to the assignees of the present invention concerning various aspects of data network operation including U.S. Pat. Nos. 5,079,768; 5,115,433; and 5,007,052.

A common task that must be periodically performed in any network is the updating of network software in each of the physically separate machines that make up the network. The network software resides individually in each physically separate network node and controls how that machine interacts with the network. In general, changing the network software involves installing the new software on all of the machines in the network. This may be done manually by a human operator at each machine but is preferably done over the network in such a way that one node on the network directs the other nodes to accept data transmissions that include the new program code and then directs the nodes to execute the new code.

Typically, the data file that contains the new executable program code is very large when compared to other files transmitted on the network and may take many minutes to several hours to transmit, even just between two nodes. Updating all the nodes on a network can therefore consume significant network resources, particularly if the program code file is routed independently from the source node to each node in the network.

Two methods known in the art for program downloading are direct transmission and code float.

In direct transmission, an error free and correctly ordered connection is created between the computer that serves as the executable code source (the source) and the computer that requires the code update (the destination). Code is then sent, properly demarcated as to destination location. The destination computer then can store the received executable code in a local store for later execution upon successful and complete receipt.

This method has several drawbacks in practice, especially when utilized in attempting code download to a multitude of nodes in a geographically distributed broadcastless communication environment. First, when a large number of nodes require simultaneous updating, keeping track of the progress of the individual downloads becomes logistically difficult. In addition, the described method requires that the medium over which the download is proceeding be error free. To create an error free connection over any of several unreliable media requires substantial computing resources to be dedicated to the maintenance of each connection. In practice, this limits the number of simultaneous connections (downloads) that can exist. Finally, the path between the code source and the destination node must remain intact throughout the download. This requirement places possibly severe demands on the stability of the network topology; in environments where the network topology is changing rapidly, it may not be possible to maintain a connection for the length of time required for the complete code transfer.

Another method for the transport of executable code is often called the "code float" method. In this method, data packets containing the executable code are "floated" over the network medium to all the nodes in the network. Each node keeps track of the blocks it has received (or those it has not received and thus requires). When it has received and validated all the blocks of code it requires, the node generally sends in a report to the source stating that "it is done downloading." When all the nodes have reported in, the source can stop and free the consumed data bandwidth for other uses.

This method also has several drawbacks in practice that place limits on its effectiveness for download to geographically distinct nodes. First, the method requires that a broadcast medium (or a close approximation) be available for "floating" the code out. In addition, much data is sent out redundantly; the source does not know which blocks are still required by the receiving nodes and thus usually just keeps sending blocks in sequence until all the nodes have reported in as complete (or conversely, have reported in that they still need blocks of code). Finally, code floating by nature is best utilized when all the nodes in a network are homogeneous. It is unsuited for the download of different code bodies, for example in the case where nodes with completely different functionality are required.

What is needed is a method for distributing large files possibly containing executable code to a large number of nodes in a network that does not have the inefficiencies associated with direct transmission or code float.

SUMMARY OF THE INVENTION

According to the invention, in a wireless mesh packet communications system wherein a multitude of nodes exist that are not able to cheaply broadcast, executable code download may be accomplished by informing each destination node of the location (also called an address) of a source node and a description of the data file blocks at that source that make up an executable code file. The destination (or code recipient) is completely responsible for executing and completing the code download; the source of the executable code need only respond to requests for a given block of data—no other state information or connection resources are required.

In the selected environment, this method has several critical advantages over competing approaches. First, any number of destination nodes may download code from a selected source node at a time (subject only to the maximum data bandwidth supportable by the source node). This flexibility is a benefit in operational networks. In addition, since the destination node is responsible for requesting the blocks it requires, only those blocks of data that are required will be transported through the network. This leads to an optimally efficient transfer. Finally, multiple sources may support download simultaneously. Thus, several dissimilar nodes may be updated without having to "wait their turn".

The invention will be better understood by reference to the following detailed description in connection with the accompanying drawings.

DETAILED DESCRIPTION OF SPECIFIC EMBODIMENTS

Figure 1:
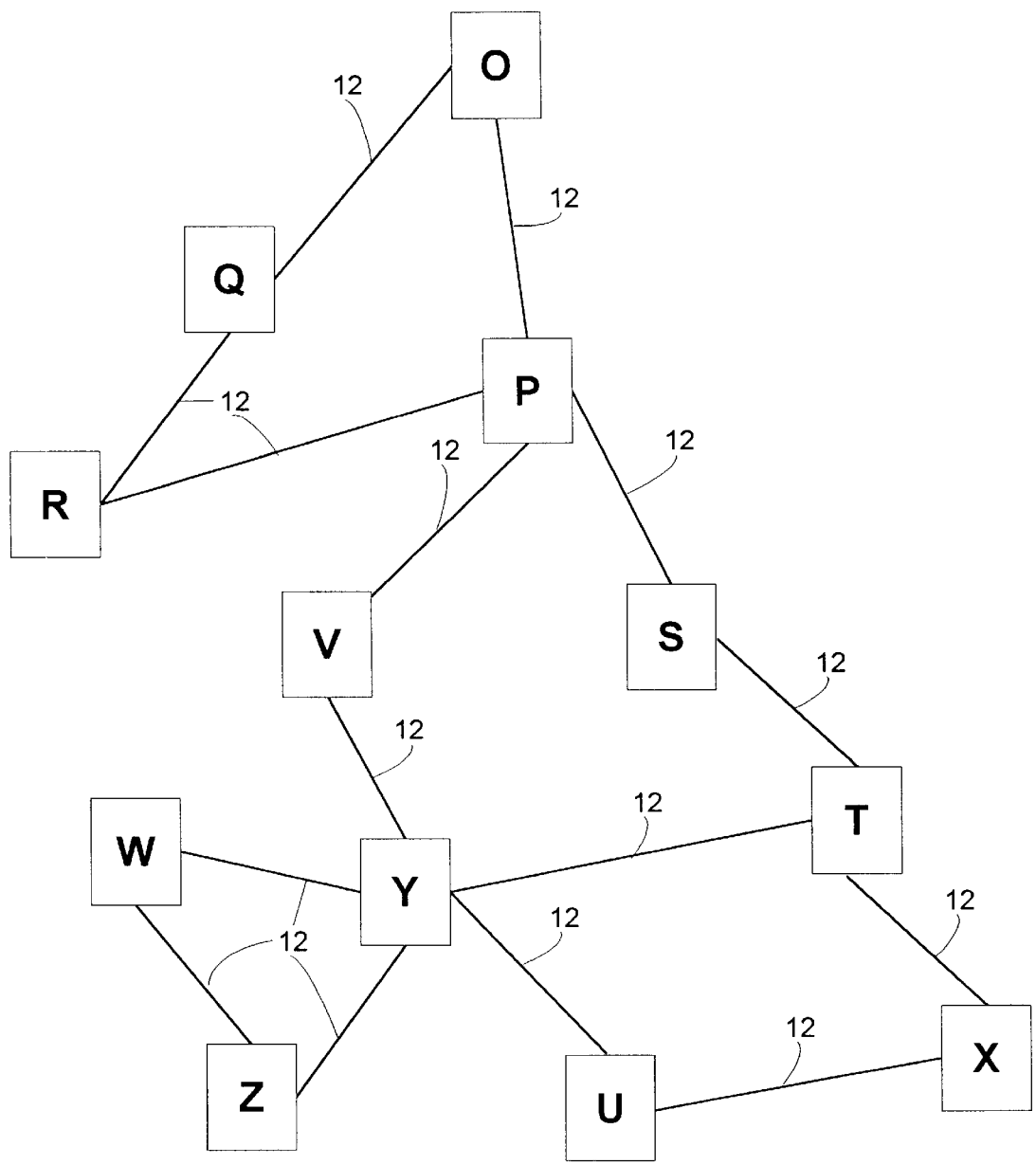
FIG. 1 is a block diagram illustrating a prior art general data network topology in which the method according to the invention may be effectively employed.

FIG. 1 shows a data network of a type in which the method according to the present invention may be employed. The network consists of nodes 10 labelled O through Z interconnected by paths 12 representing allowable communication links between nodes.

According to the present invention, executable code downloading is initiated from one initiating source node, such as node V. Node V acquires the executable code either manually or otherwise and then it is available to other nodes, such as nodes P and Y, for downloading. Once node V has acquired the executable code, a network controller sends a message to destination nodes P and Y to which node V is connected, instructing those destination nodes to request program code transmission from node V. The network controller may be one of the nodes in the network having network control capabilities or it may be a human operator. Nodes P and Y then each independently begin requesting blocks of executable code to be transmitted from node V. Nodes P and Y continue requesting blocks from node V, until they have received the full executable code file. When nodes P and Y have successfully received the full executable code file, they each inform the network controller that downloading is complete.

According to one embodiment of the invention, this distributed downloading occurs iteratively such that, once the network controller is informed by node Y that it has received the executable code file, the network controller transmits a packet to each of nodes W, Z, U, and T, instructing those nodes to request executable code transmission from node Y. Nodes W, Z, U, and T then each independently begin requesting blocks of executable code to be transmitted from node Y and continue requesting blocks from node Y, until they have received the full executable code file. Each node sends an acknowledge packet to inform the network controller that downloading is complete. Likewise, the network controller transmits a packet to each of nodes S, O, and R, instructing those nodes to request program code download from node P.

Figure 2:
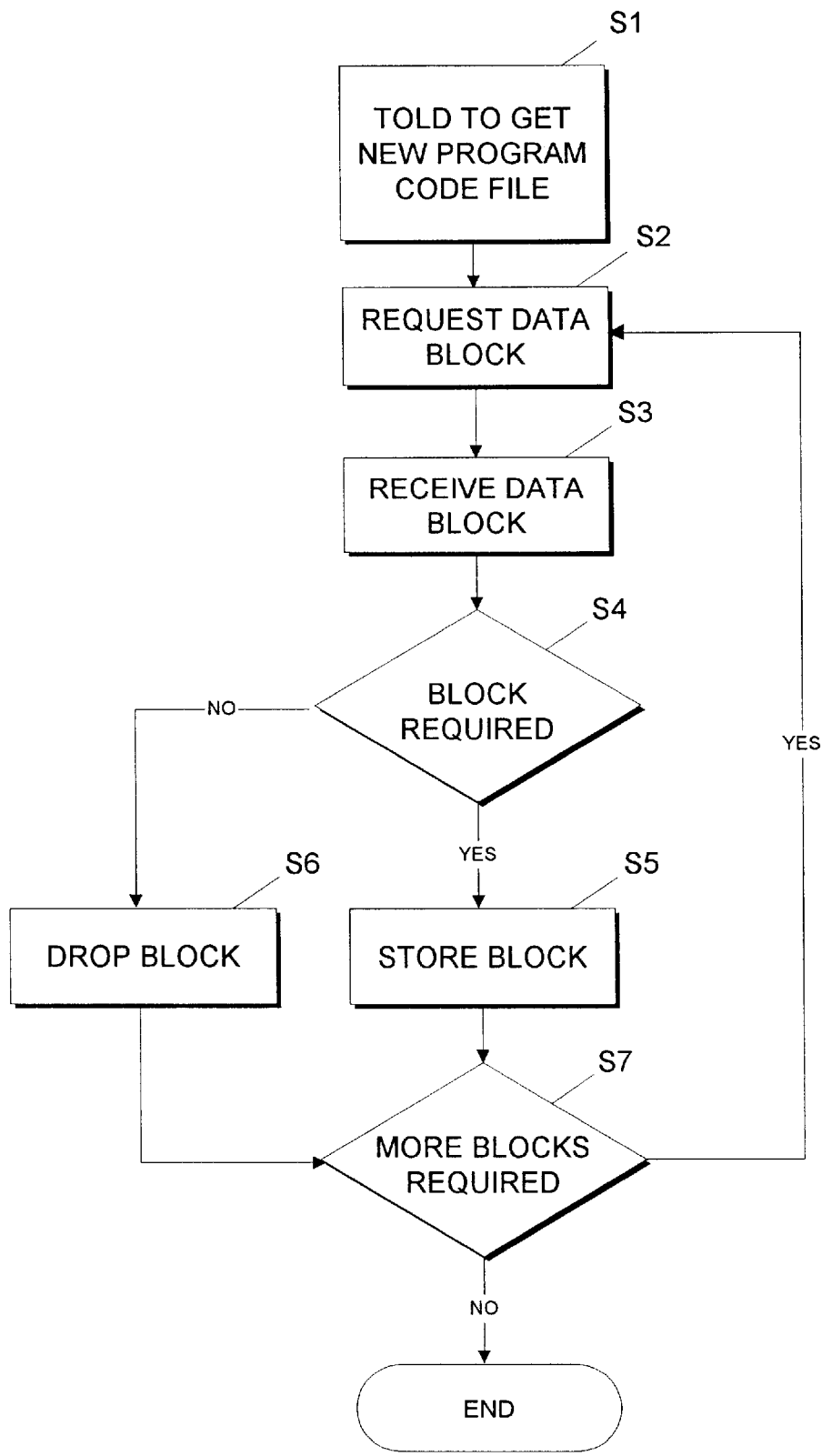
FIG. 2 is a flow chart describing program code downloading by a destination node.

FIG. 2 depicts a flow chart illustrating the operation of a destination node according to one embodiment of the present invention. While the steps of this process are shown in a particular order, it will be obvious to one of ordinary skill in the art that the order of some of the subprocesses contained in this process could be changed and that some steps of this process could be handled in parallel.

The process begins when a destination node receives a command packet from the network controller to download a new program code file from a particular source node (Step S1). This program file will typically have been transferred to the initial source node manually, such as by loading a floppy disk or other removable media onto the source node, or the file may be transferred to the source node over a dial-up phone line connection to the source node. The command packet contains the information the destination node needs to download the full program code file including the address of the source node, identifiers for the data blocks in the file, and an address of a node to which the destination node must send an acknowledgement when downloading is complete. The destination node then begin requesting blocks from the source node (Step S2). Once a request for a block has been made, the destination node waits to receive a block back from the source node (Step S3). When a block is received, the destination node checks to see if it requires the block for its executable code (Step S4). If the block is required, the destination node stores the block (Step S5) and checks to see if more blocks are required (Step S7). If the block is not required, the destination node drops or discards the block (Step S6) and checks to see if more blocks are required (Step S7). If more blocks are required, the destination node requests the next block (Step S2) and the process loops. If more blocks are not required, the destination node has received all the blocks that make up the executable code, it sends a message to the network controller informing it of that, and the process ends.

Figure 3:
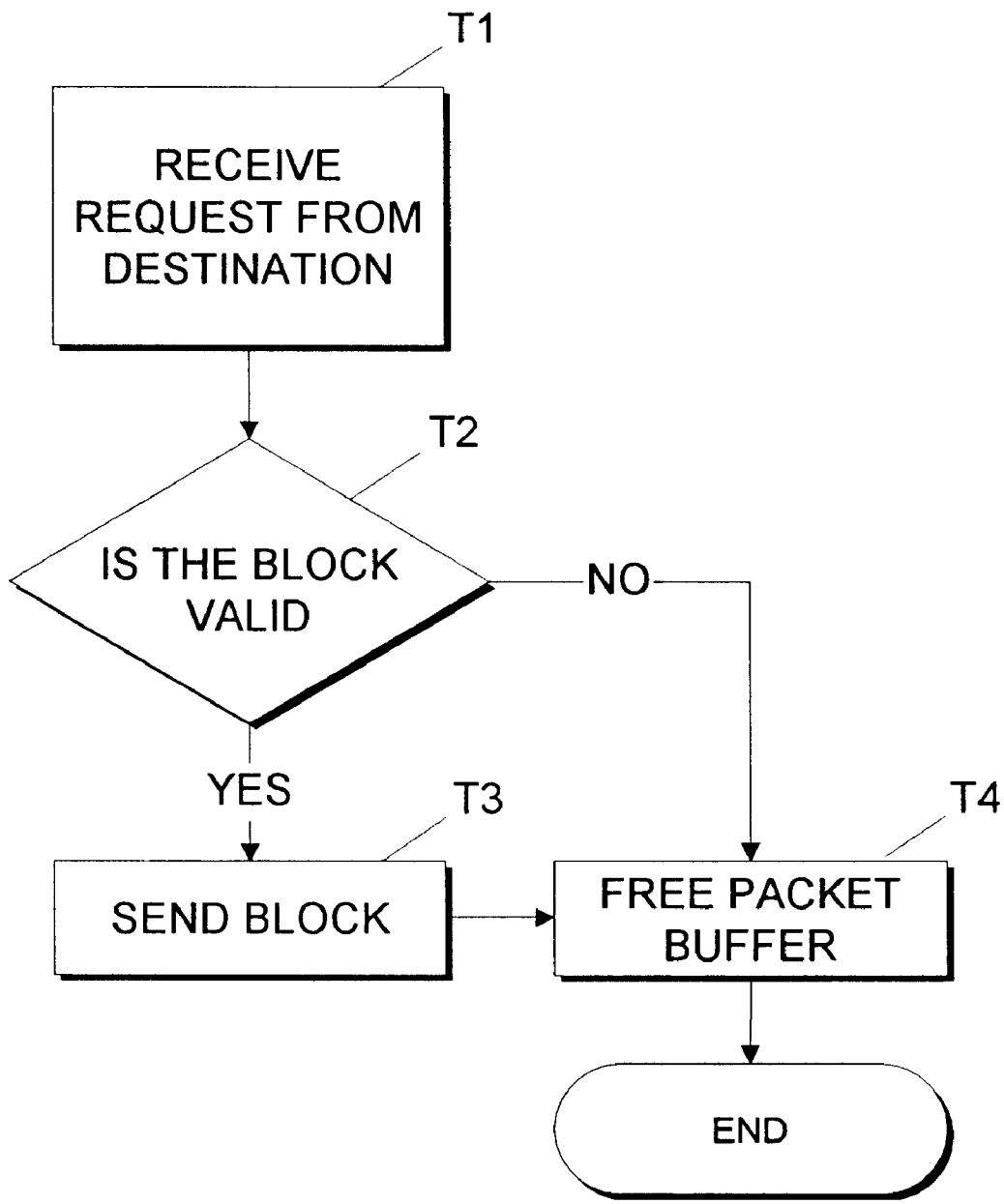
FIG. 3 is a flow chart describing program code downloading by a source node responding to requests for block transfer from a destination node.

FIG. 3 depicts a flow chart illustrating the operation of a source node according to one embodiment of the present invention. The process begins when the source node receives a request packet from a destination node to transmit a block of data (Step T1). The source node checks to see if the request is for a valid block in its executable code (Step T2). If the block is not valid, the source node frees its packet transmit buffer (Step T4) and the process ends. If the block is valid, the source node first sends the block to the destination node (Step T3) then frees its packet transmit buffer (Step T4) and the process ends.

It will be apparent that this method of program code downloading has a number of advantages over code-float or direct transmission. First is that downloading to all nodes in a network will be faster than with direct transmission, in part because the iterative downloading may occur in parallel. Once node Y and P in FIG. 1 have each received a complete program code file, the nodes that get their program code from Y and P can do so independently and simultaneously.

This method is also especially suited for networks made up of different types of network nodes, such as stationary nodes and roaming nodes, where the different nodes require different program code. With this method, downloading of program code to the different types of nodes can occur completely independently.

A number of modifications to this method will be obvious to one of ordinary skill in the art. For example, the functions of the network controller could be transferred to each node such that once a destination node had completed program downloading, that destination node would send command packets to other nodes with which it could communicate instructing those other nodes to request program code downloading.

The invention has now been explained with reference to specific embodiments. Other embodiments will be apparent to those of ordinary skill in the art. It is therefore not intended that this invention be limited except as indicated by the appended claims.

What is claimed is:

1. In a wireless mesh packet communications network, said network comprising a plurality of intelligent nodes interconnected by wireless links, a method for updating program code of the network, comprising the steps of:

acquiring a program code file at a source node;

dividing said program code file into blocks of a size easily transmitted on the network;

transmitting a command packet from a network controller to a plurality of destination nodes said command packet directing said destination nodes to request program code downloading from said source node; and in response to said command packet, beginning independent program code downloading at each of said destination nodes by said destination nodes sending individual block requests to said source node for said source node to transmit blocks containing said program code.

2. The method according to claim 1 wherein said command packet includes an address for the source node and a block list identifying the blocks that comprise the program code file.

3. The method according to claim 1 wherein said command packet includes a second list of nodes referred to as secondary destination nodes and wherein said destination node sends a secondary command packet to said secondary destination nodes after said destination node has completed program code downloading said secondary command packet directing said secondary destination nodes to request blocks of said program code to be downloaded from said destination node.

4. The method according to claim 1 wherein said command packet includes an address for a network controller to which said destination nodes will send a download complete packet when said destination nodes have successfully completed program code downloading.

5. The method according to claim 3 further comprising:

when downloading is complete at a destination node, determining whether there are any secondary destinations nodes needing to receive program code from that destination node;

if secondary destination nodes exist, transmitting a command packet to said secondary destination nodes;

in response to said command packet, beginning independent program code downloading at each of said secondary destination nodes, by said secondary destination nodes sending individual block requests to said destination node for said destination node to transmit blocks containing said program code; and repeating the above method steps iteratively at each secondary destination node until there are no nodes remaining in the network that need to receive program code.

6. The method according to claim 5 wherein said command packets are transmitted to said secondary destination nodes by said network controller.

7. The method according to claim 5 wherein said command packets are transmitted to said secondary destination nodes by said destination node.

8. In a wireless mesh packet communications network, said network comprising a plurality of intelligent nodes interconnected by wireless links, method for transmitting the large data file to the plurality of intelligent nodes in a network, comprising the steps of:

acquiring the large data file at a source node dividing the large data file into blocks of a size easily transmitted on the network;

transmitting a command packet to a plurality of destination nodes said command packet directing said destination nodes to request program code downloading;

in response to said command packet, beginning data file transfer from said source node to said destination nodes by said destination nodes each sending individual transmit requests to said source node for said source node to transmit said large data file.

9. The method according to claim 8 wherein said command packet includes an address for a source node and a block list identifying blocks that comprise the data file.

10. The method according to claim 9 wherein said command packet includes a list of secondary destination nodes.

* * * * *